US011323348B2

(12) United States Patent
White et al.

(10) Patent No.: US 11,323,348 B2
(45) Date of Patent: May 3, 2022

(54) API DEPENDENCY ERROR AND LATENCY INJECTION

(71) Applicant: Citrix Systems, Inc., Fort Lauderdale, FL (US)

(72) Inventors: Jeremy White, Fort Lauderdale, FL (US); Shawn Edmondson, Raleigh, NC (US); Chiradeep Vittal, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 81 days.

(21) Appl. No.: 16/415,688

(22) Filed: May 17, 2019

(65) Prior Publication Data
US 2020/0366587 A1 Nov. 19, 2020

(51) Int. Cl.
| H04L 12/26 | (2006.01) |
| H04L 12/911 | (2013.01) |
| H04L 43/0823 | (2022.01) |
| H04L 43/04 | (2022.01) |
| H04L 43/0876 | (2022.01) |
| H04L 47/70 | (2022.01) |

(52) U.S. Cl.
CPC ......... *H04L 43/0823* (2013.01); *H04L 43/04* (2013.01); *H04L 43/0876* (2013.01); *H04L 47/822* (2013.01)

(58) Field of Classification Search
CPC .................................................. H04L 43/0823
See application file for complete search history.

(56) References Cited

U.S. PATENT DOCUMENTS

| 10,678,665 | B2 * | 6/2020 | Shmouely | ........... G06F 11/3495 |
| 2017/0242784 | A1 * | 8/2017 | Heorhiadi | ........... G06F 11/3692 |
| 2018/0089011 | A1 * | 3/2018 | Basiri | ................. G06F 11/3006 |
| 2018/0316741 | A1 * | 11/2018 | Hassan | ................. H04L 65/602 |
| 2019/0089740 | A1 | 3/2019 | Hastings | |
| 2020/0112497 | A1 * | 4/2020 | Yenumulapalli | .... H04L 41/5009 |

OTHER PUBLICATIONS

Extended European Search Report on EP Appl. No. 20173190.8 dated Sep. 28, 2020.

* cited by examiner

*Primary Examiner* — Joe Chacko
(74) *Attorney, Agent, or Firm* — Foley & Lardner LLP

(57) ABSTRACT

The disclosure is directed towards systems and methods for injecting or introducing synthetic errors and latency for testing purposes into microservices provided by one or more servers. A device acting as an intermediary to communication can inject errors into responses or requests traversing the device. The errors can include additional latency, dropped packets, or memory or disk errors. Introducing errors and latency for testing purposes can be used to proactively monitor and identify issues with resources.

20 Claims, 11 Drawing Sheets

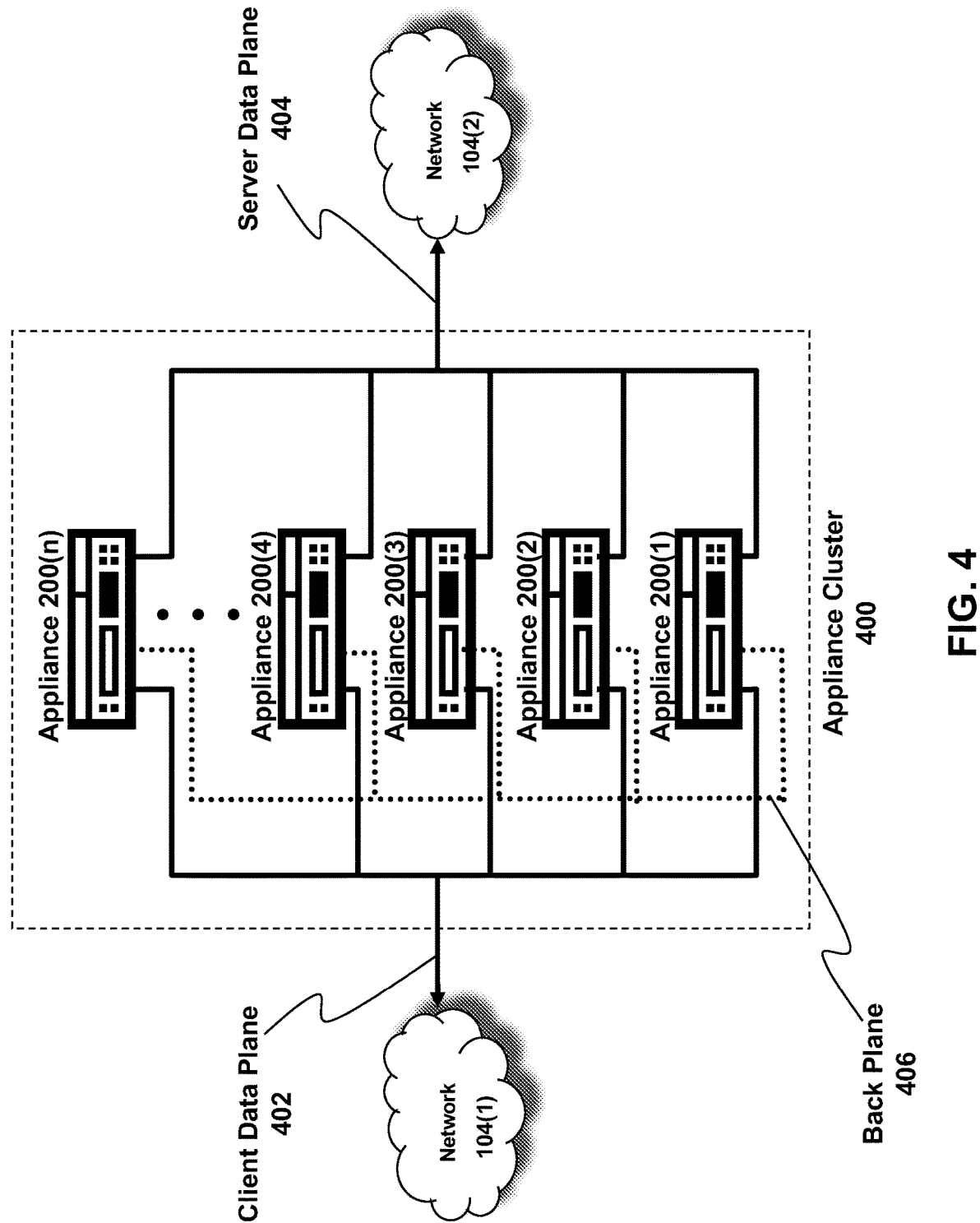

… (1) …

API DEPENDENCY ERROR AND LATENCY INJECTION

FIELD OF THE DISCLOSURE

The present application generally relates to communications, including but not limited to systems and methods for network resource monitoring.

BACKGROUND

Network provided services, such as web applications, virtual machines, hosted resources, or other such services, may be adversely affected by errors and latency. However, in many instances, these errors may be intermittent, making it difficult to proactively identify and mitigate problems.

SUMMARY

This Summary is provided to introduce a selection of concepts in a simplified form that are further described below in the Detailed Description. This Summary is not intended to identify key features or essential features, nor is it intended to limit the scope of the claims included herewith.

In some implementations, to proactively monitor and identify issues with resources, a system may be configured with the ability to introduce synthetic errors and latency, with "synthetic" referring to intentionally introduced errors as opposed to "organic" errors or errors that arise within the system and not from intentional introduction during testing. The configuration and enablement of these synthetic errors and latency may be managed within or for each service. For example, in some implementations, by passing all calls through a proxy capable of injecting errors and latency, any service in communication with the proxy can reap the benefits of error detection and mitigation, such as validating how a service behaves when a dependent service begins misbehaving. By providing a consistent and standard configuration for injecting errors and latency, all services can be tested with this method.

The proxy handling all East/West microservice traffic (e.g. network traffic communicated between microservices of the services such as within a data center or between data centers) may pull from a centralized configuration to determine error rates, latencies, and activities to be injected when criteria is met. This configuration may also include time frames or schedules for testing, as well as filtering for what calls and services are impacted. Responses to synthetic errors may be from a third party call, a static document, or a custom script language to respond with payloads based on the request.

An aspect provides a method for validating a microservice. The method includes (a) identifying, by a device intermediary to a plurality of microservices, a synthetic error and a first criteria for implementing the synthetic error to validate a first microservice of the plurality of microservices. The method also includes (b) determining, by the device, that the first criteria for implementing the synthetic error has been met. The method also includes (c) receiving, by the device, a request from the first microservice to access a second microservice of the plurality of microservices. The method also includes (d) communicating, by the device responsive to the determination, to the first microservice, a response on behalf of the second microservice, the response implementing the synthetic error. The method also includes (e) validating, by the device, that the first microservice one of handled or did not handle the synthetic error.

In some implementations, the first criteria comprises one of a time period, a duration or a frequency. In some implementations, the first criteria comprises one of a status or a condition of one or more of the plurality of microservices. In a further implementation, (b) further includes monitoring, by the device, one of the status or the condition of the one or more of the plurality of microservices to determine that the first criteria has been met.

In some implementations, the first criteria comprises identification of a type of request. In a further implementation, (c) further includes determining, by the device, that the request corresponds to the type of request of the first criteria.

In some implementations, (a) further includes identifying, by the device, a latency time and a second criteria for implementing the latency. In a further implementation, the method includes determining, by the device, that the second criteria has been met. In a still further implementation, the method includes receiving, by the device, a second request from the first microservice to access one of the plurality of microservices; delaying, by the device, a second response to the second request in accordance with the latency time; and validating, by the device, that the first microservice one of handled or did not handle the latency.

In some implementations, the method includes identifying, by the device, one of a plurality of synthetic errors or a plurality of latency times to implement responsive to a plurality of criteria to validate one or more of the plurality of microservices; and responding, by the device, to requests by implementing the one of the plurality of synthetic errors or one of the plurality of latency times.

In another aspect, the present disclosure is directed to a system for implementing a synthetic error to validate a microservice. The system includes a device comprising one or more processors, coupled to memory and intermediary to a plurality of microservices. The device is configured to: identify a synthetic error and a first criteria for implementing the synthetic error to validate a first microservice of the plurality of microservices; determine that the first criteria for implementing the synthetic error has been met; receive a request from the first microservice to access a second microservice of the plurality of microservices; communicate, responsive to the determination, to the first microservice, a response on behalf of the second microservice, the response implementing the synthetic error; and validate that the first microservice one of handled or did not handle the first synthetic error.

In some implementations, the first criteria comprises one of a time period, a duration, or a frequency. In some implementations, the first criteria comprises one of a status or a condition of one or more of the plurality of microservices. In a further implementation, the device is further configured to monitor one of the status or the condition of the one or more of the plurality of microservices to determine that the first criteria has been met.

In some implementations, the first criteria comprises identification of a type of request. In a further implementation, the device is further configured to determine the request corresponds to the type of request of the first criteria.

In some implementations, the device is further configured to identify a latency time and a second criteria for implementing the latency. In a further implementation, the device is further configured to determine that the second criteria has been met. In a still further implementation, the device is further configured to receive a second request from the first microservice to access one of the plurality of microservices;

delay a second response to the second request in accordance with the latency time; and validate that the first microservice one of handled or did not handle the latency.

In some implementations, the device is further configured to identify, in order to validate one or more of the plurality of microservices, one of a plurality of synthetic errors or a plurality of latency times to implement responsive to a plurality of criteria; and respond to requests to implement the one of the plurality of synthetic errors or one of the plurality of latency times.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 4 is a block diagram of a cluster system, in accordance with an illustrative embodiment;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for API dependency error and latency injection.

A. Network and Computing Environment

Figure 1A:
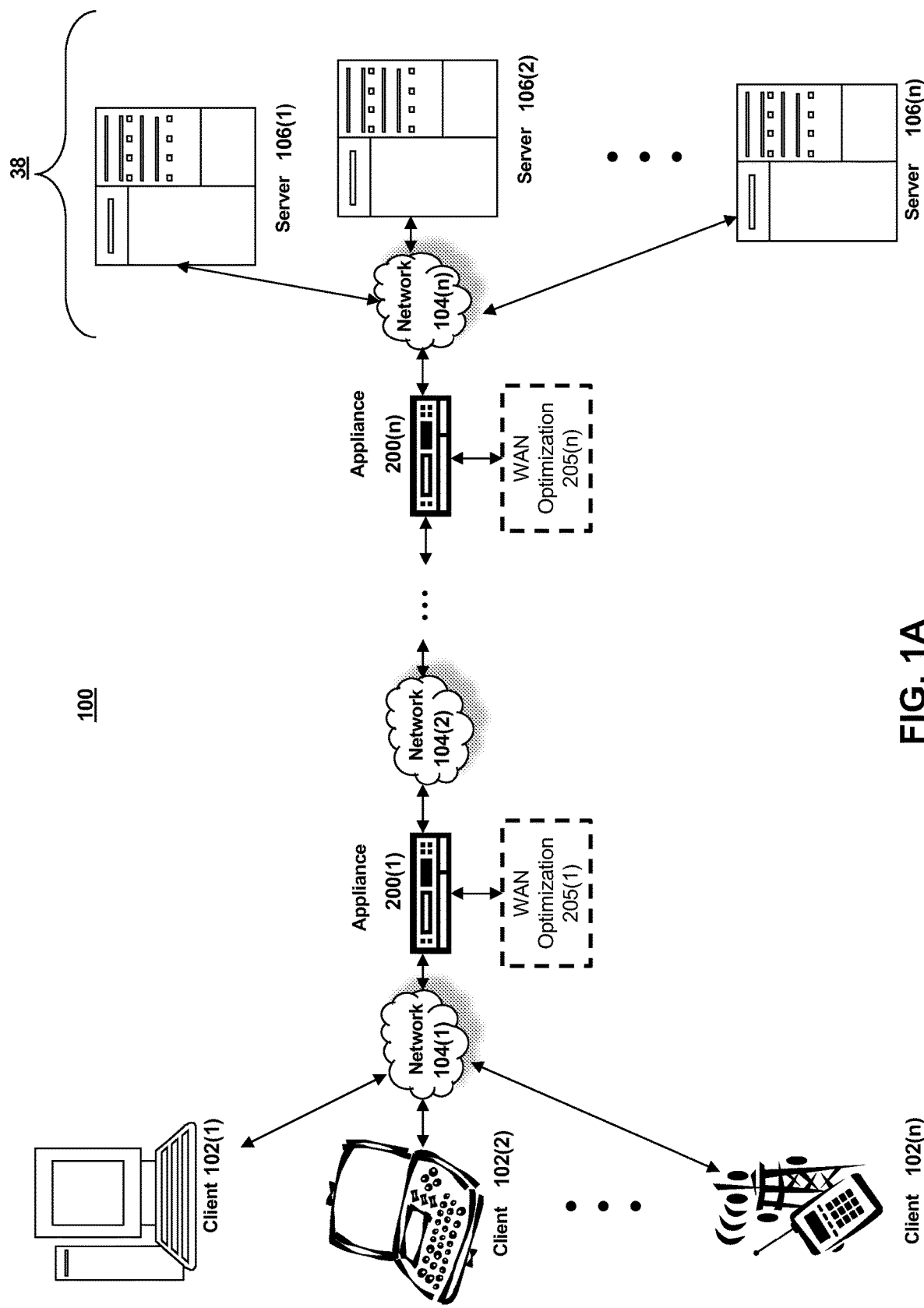
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
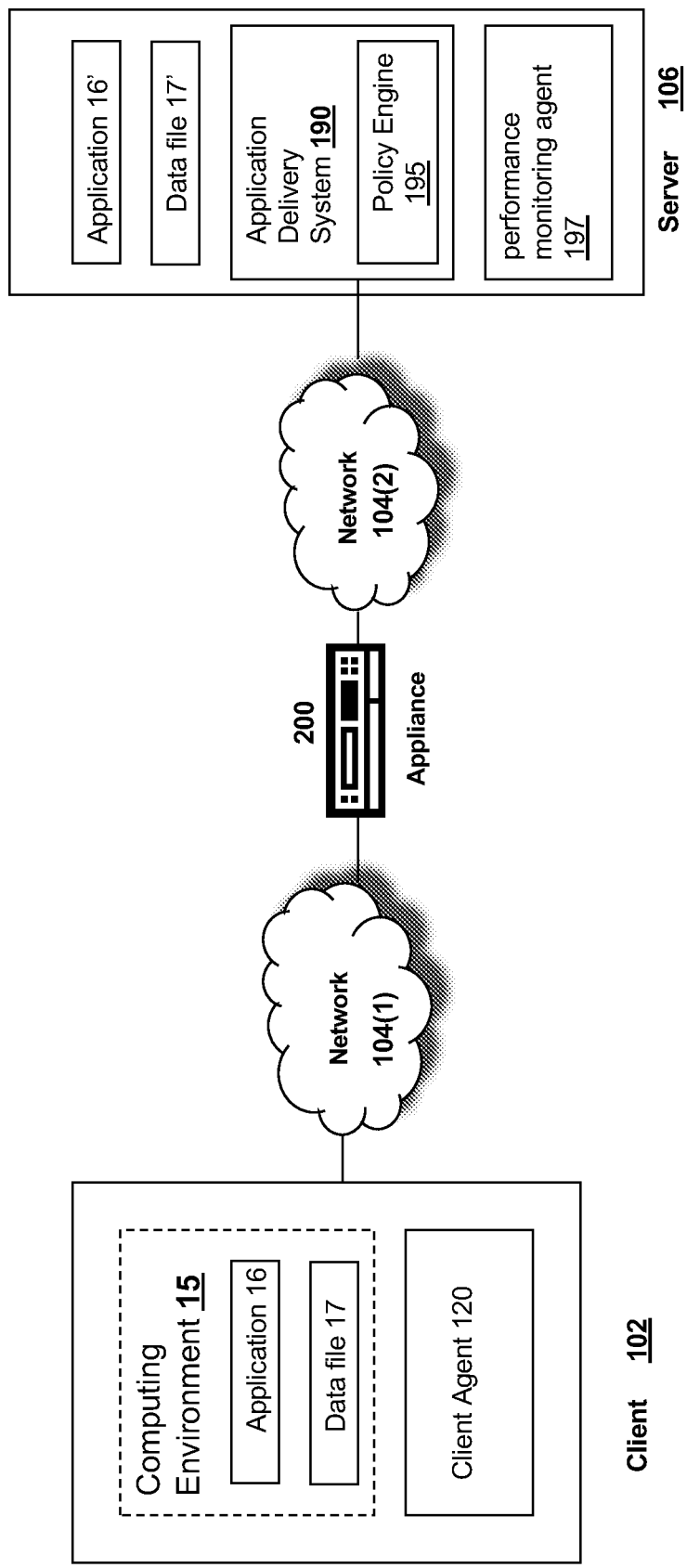
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
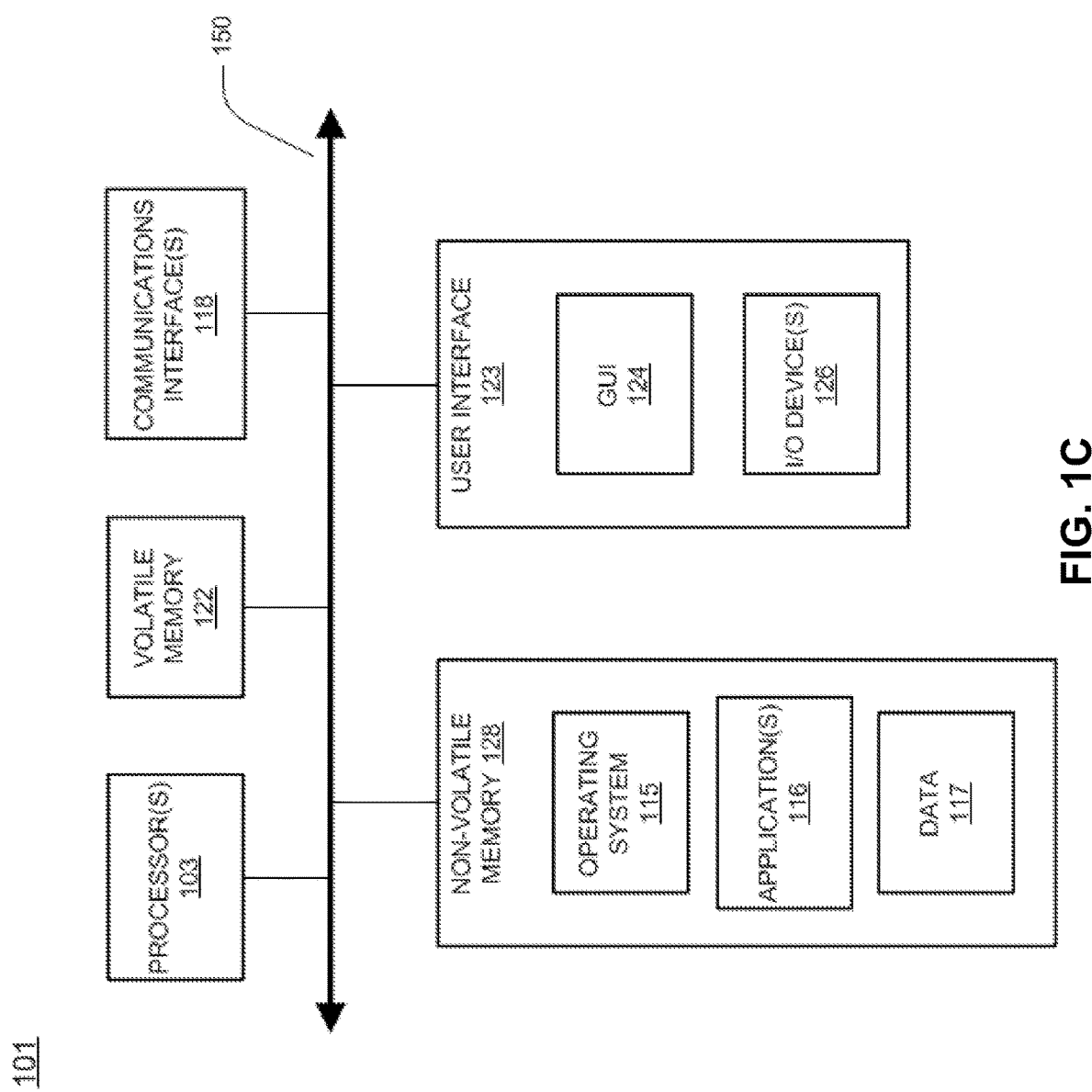
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
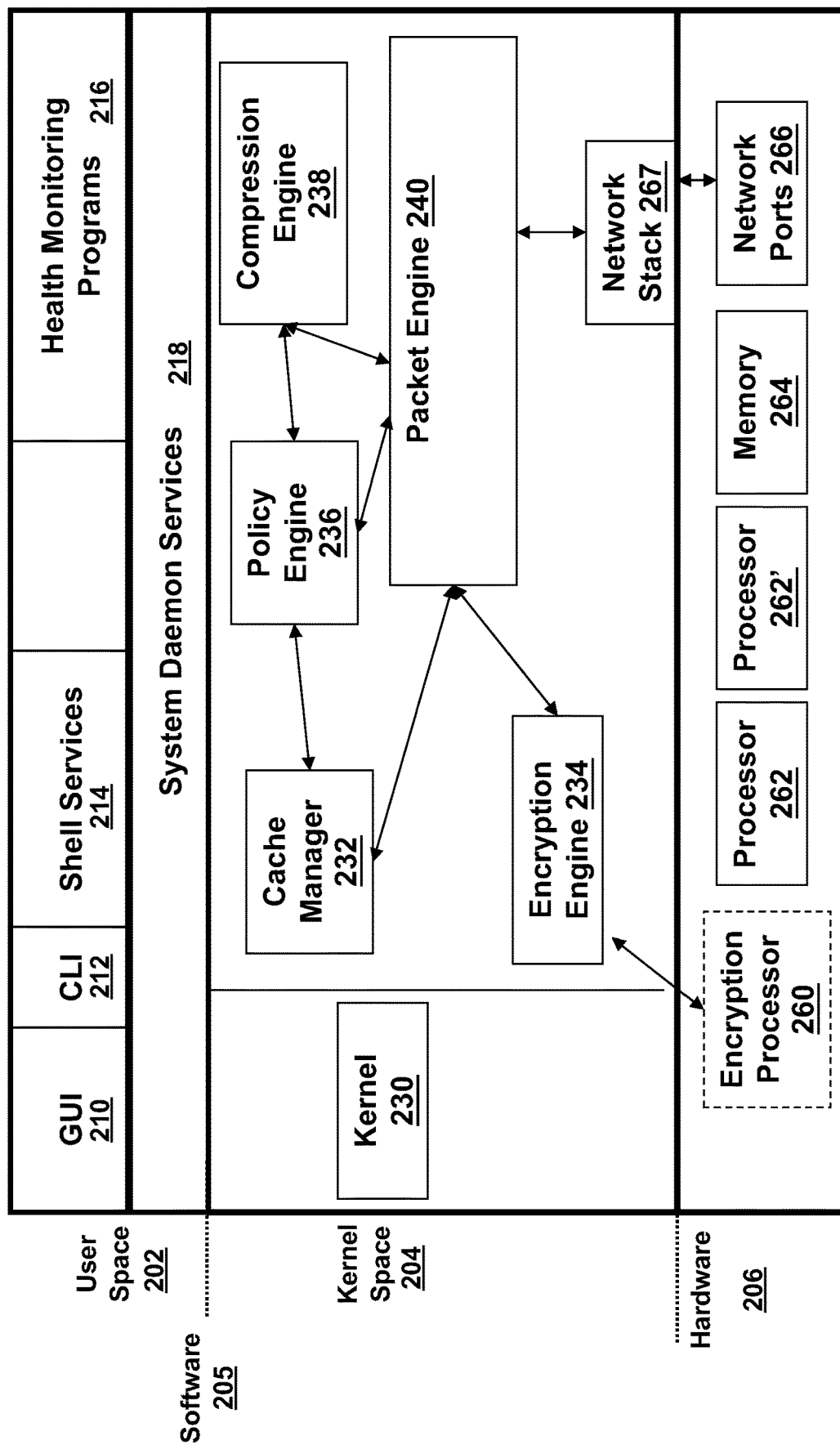
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
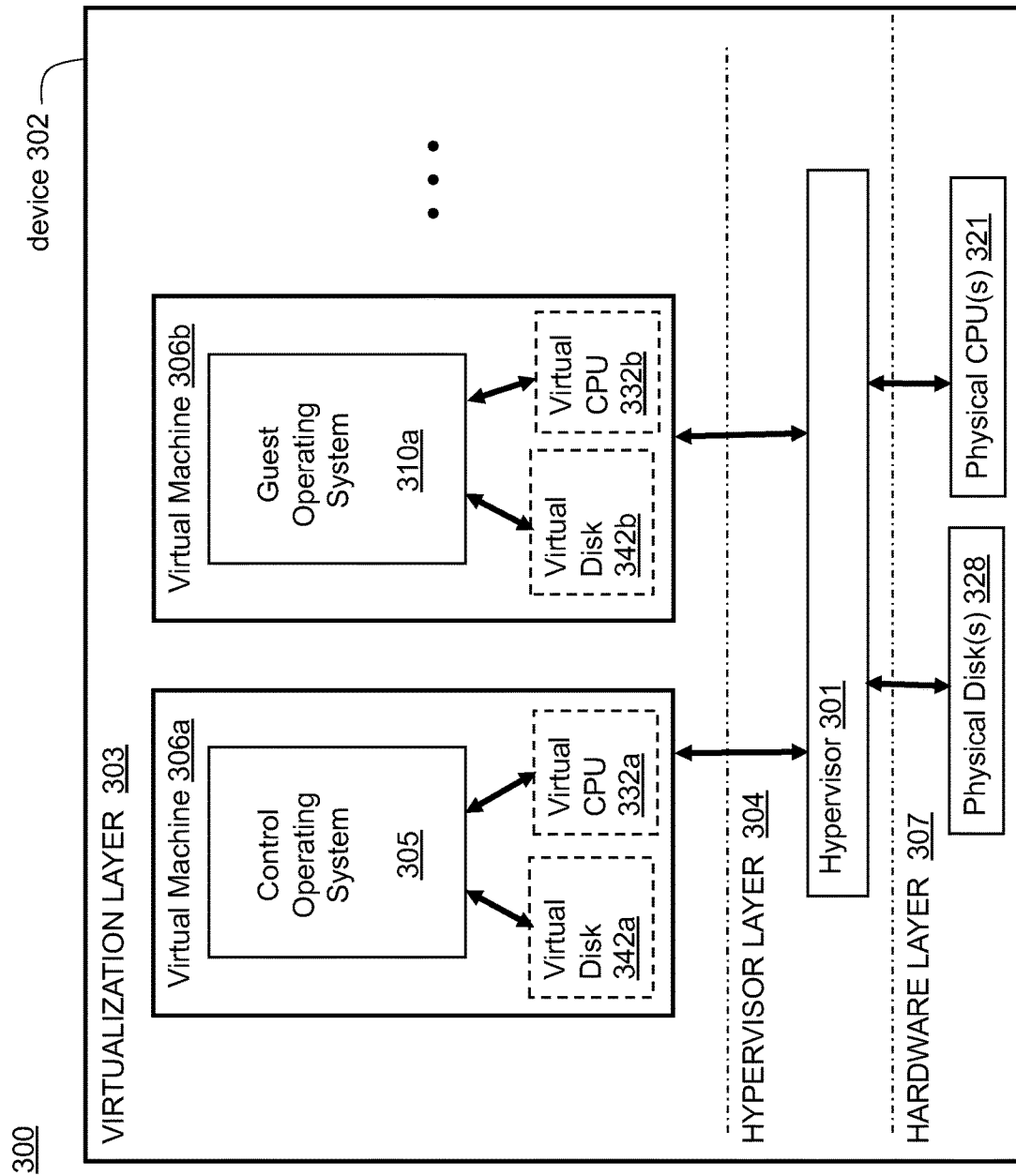
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
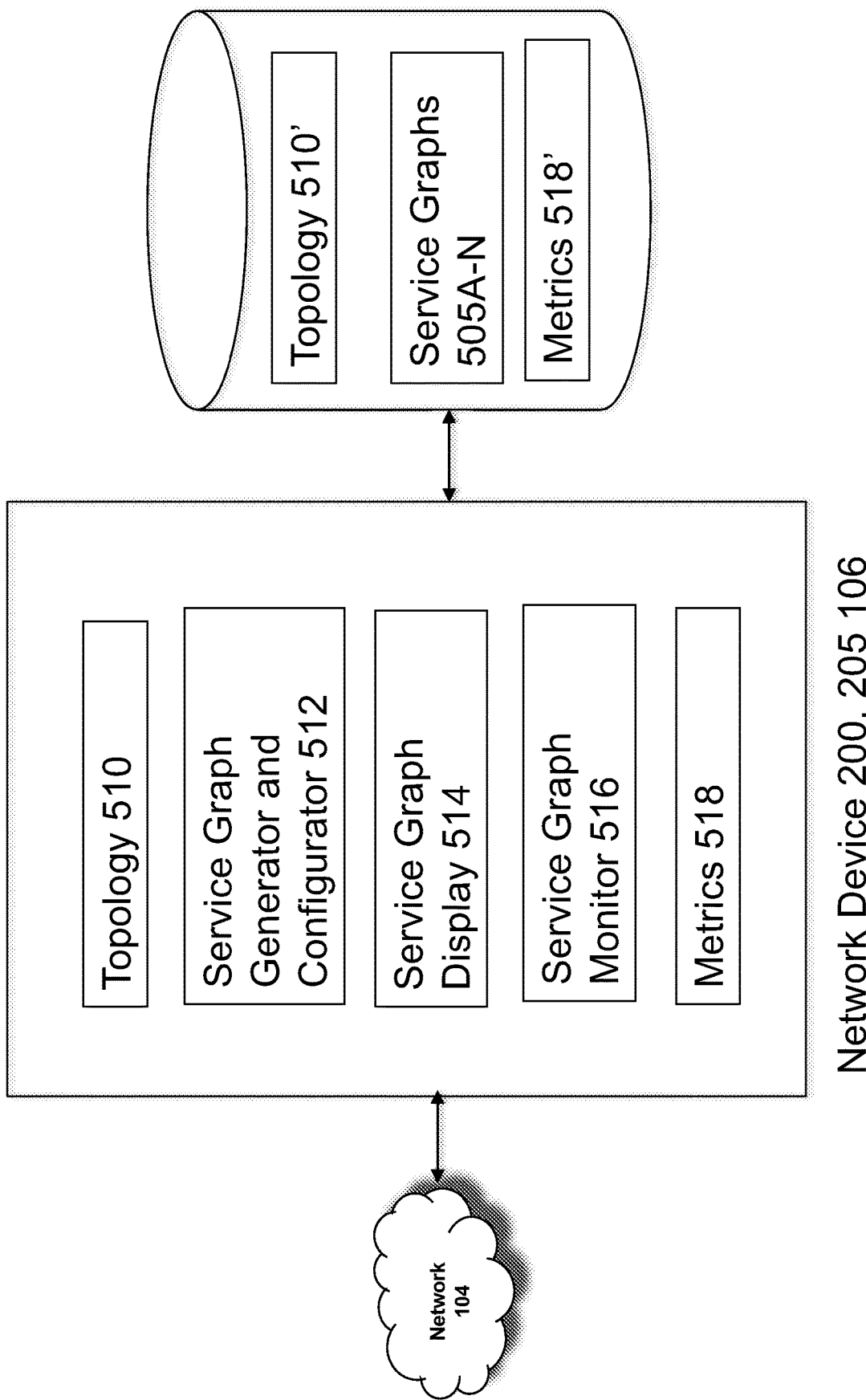
FIG. 5A is a block diagram of a service graph based system, in accordance with an illustrative embodiment.
Figure 5B:
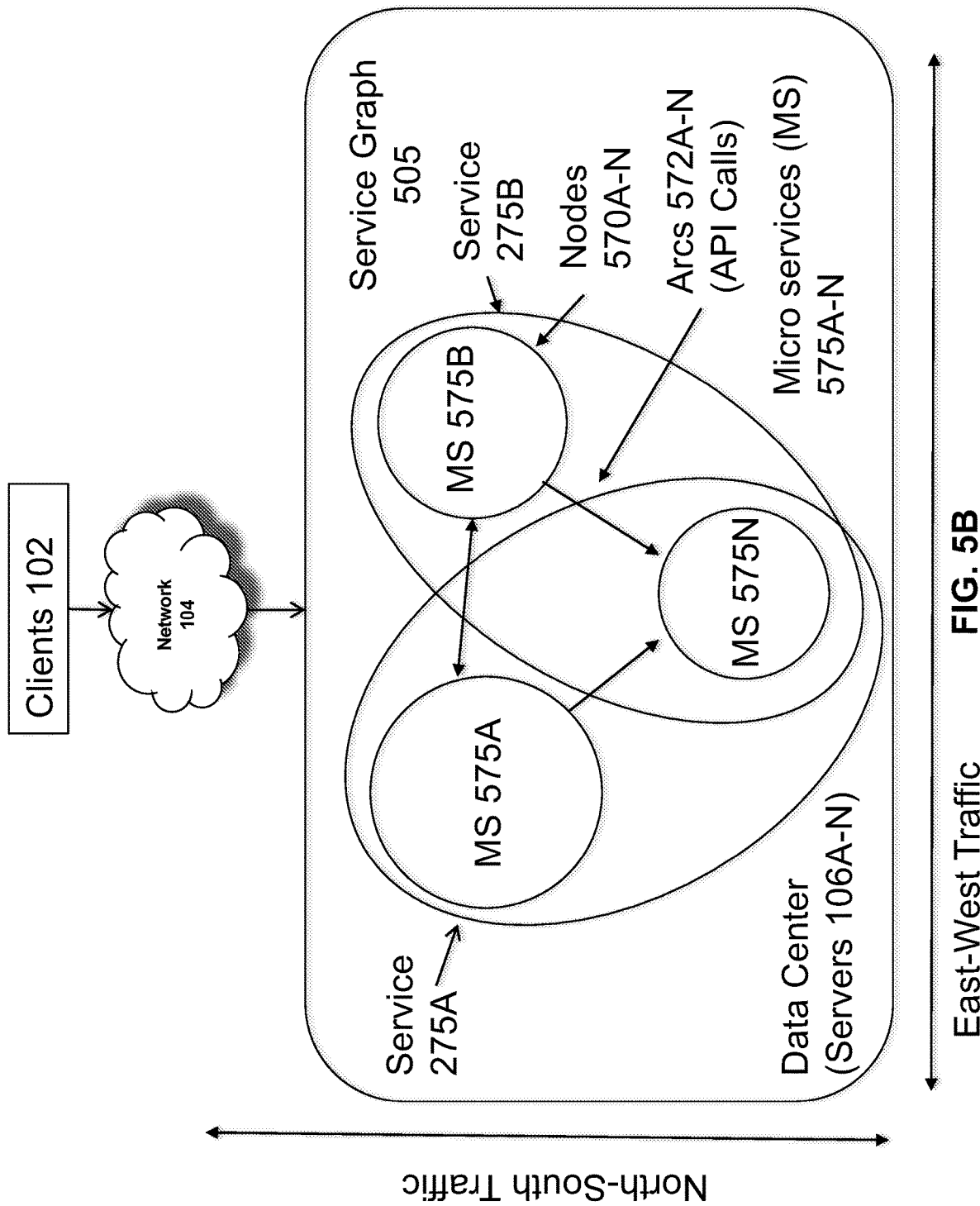
FIG. 5B is a block diagram of a service graph, in accordance with an illustrative embodiment.
Figure 5C:
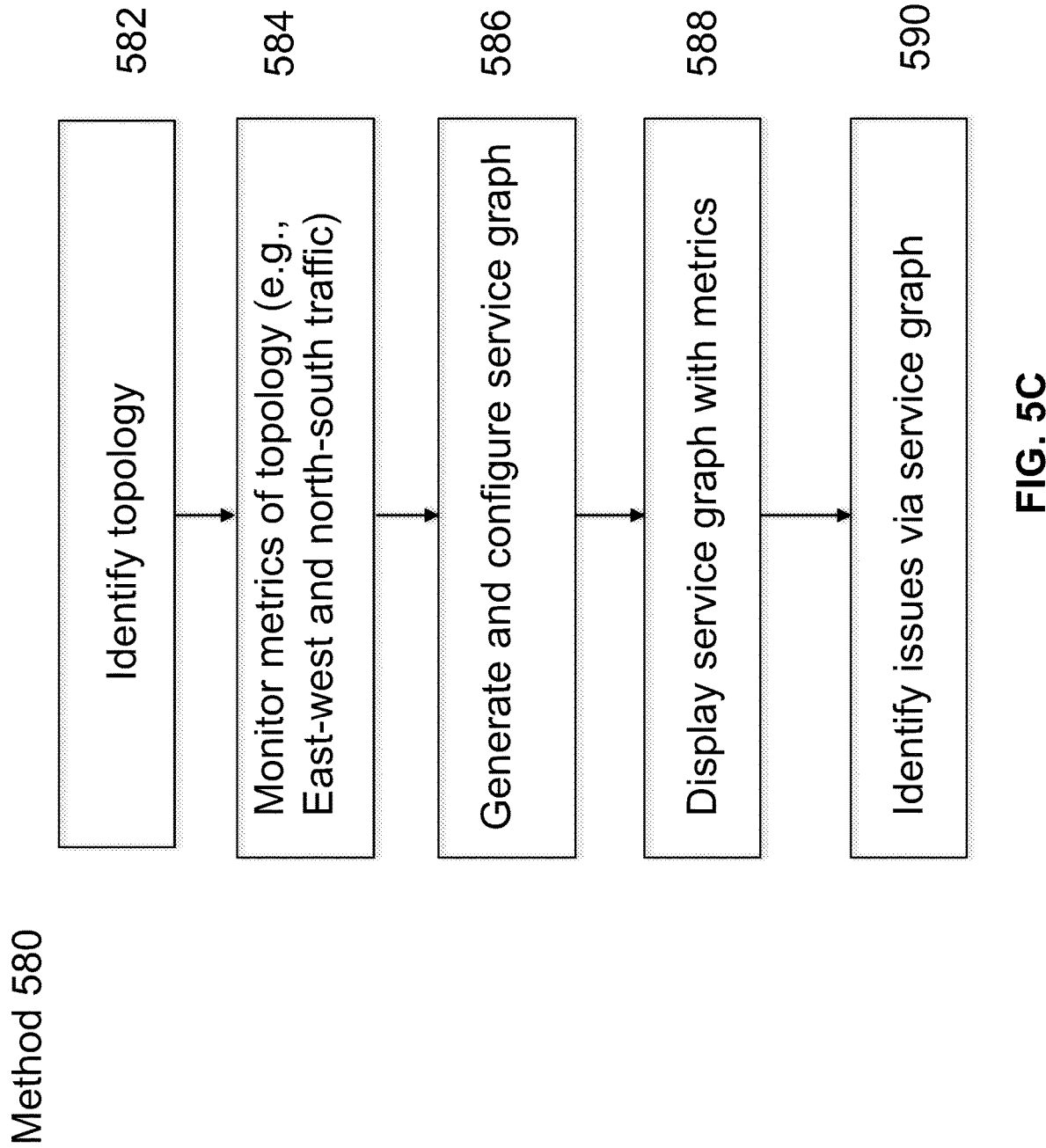
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with micro-services of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active.

A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. API Dependency Error and Latency Injection

Network provided services, such as web applications, virtual machines, hosted resources, or other such services, may be adversely affected by errors and latency. However, in many instances, these errors may be intermittent, making it difficult to proactively identify and mitigate problems. For example, intermittent noise may cause wireless access points to experience latency or dropped connections, memory or disk errors may cause processing resources to occasionally hang, etc. In typical systems, administrators frequently must wait until the error occurs and hope to catch it "in the act" in order to diagnose the issue. While logging may help somewhat in reviewing past errors, particularly complex errors may need multiple occurrences to diagnose and repair. Furthermore, all of these processes are reactive, in that administrators must wait until an error has occurred, and cannot identify and prevent future errors that have not yet occurred. In very complex systems, in which errors may come as a result of interactions between services or microservices, a potential for an error may go unnoticed for months or even years before it occurs.

Accordingly, in some implementations, to proactively monitor and identify issues with resources, a system may be configured with the ability to introduce synthetic errors and latency, with "synthetic" referring to intentionally introduced errors as opposed to "organic" errors or errors that arise within the system and not from intentional introduction during testing. The configuration and enablement of these synthetic errors and latency may be managed within or for each service. For example, in some implementations, by passing all calls through a proxy capable of injecting errors and latency, any service in communication with the proxy can reap the benefits of error detection and mitigation, such as validating how a service behaves when a dependent service begins misbehaving. By providing a consistent and standard configuration for injecting errors and latency, all services can be tested with this method.

The proxy handling all East/West microservice traffic (e.g. network traffic communicated between microservices of the services such as within a data center or between data centers) may pull from a centralized configuration to determine error rates, latencies, and activities to be injected when criteria is met. This configuration may also include time frames or schedules for testing, as well as filtering for what calls and services are impacted. Responses to synthetic errors may be from a third party call, a static document, or a custom script language to respond with payloads based on the request.

The systems and methods discussed herein provide the ability to:

Inject latency for calls between microservices, such as East/West traffic traversing an intermediary device or proxy between microservices;

Inject errors for calls between microservices, including dropped packets, corrupted packets, packet fragmentation, jitter, reordering, or any other sort of error;

Configure intra-service error/latency rate and return payloads, such as sub-MTU payloads, payloads greater than an MTU and fragmented, etc.

Provide filters on when to apply errors/latency, such as by time of day, day of week, or in response to other triggers, such as increased fragmentation or packet loss, loss of communications to a monitoring server, etc.;

Provide actions to run a script to calculate payload for errors;

Provide static error codes and payloads, such as predetermined error codes for various detected issues; and Identify calls impacted by synthetic errors, such as via http response headers.

Accordingly, various behaviors and synthetic errors may be injected responsive to various triggers. For example, in one implementation, a predetermined percentage of calls or communications to a first service Y from a second service X, such as 10%, may be responded to by a monitoring server or intermediary device with HTTP-500 errors, simulating internal server errors at service Y. In another implementation, a monitoring system or intermediary device may gradually increase latency of packets traversing the device to and/or from a service from 0 ms to 2000 ms and back down to 0 ms over the course of 10 minutes, allowing measurement of the service's ability to handle high and changing latency. In still another implementation, an intermediary device or monitoring server may delay communications to a selected geographical region or block of IP addresses by a predetermined amount, such as 30 seconds, and respond with a static HTTP-503 response, simulating packet loss or server dropouts. The services' responses to these synthetic errors may be measured and the service validated or invalidated, responsive to whether it respectively handles or does not handle the errors (e.g. whether the server successfully resumes communications, recovers from errors, properly logs errors, etc.).

Figure 6A:
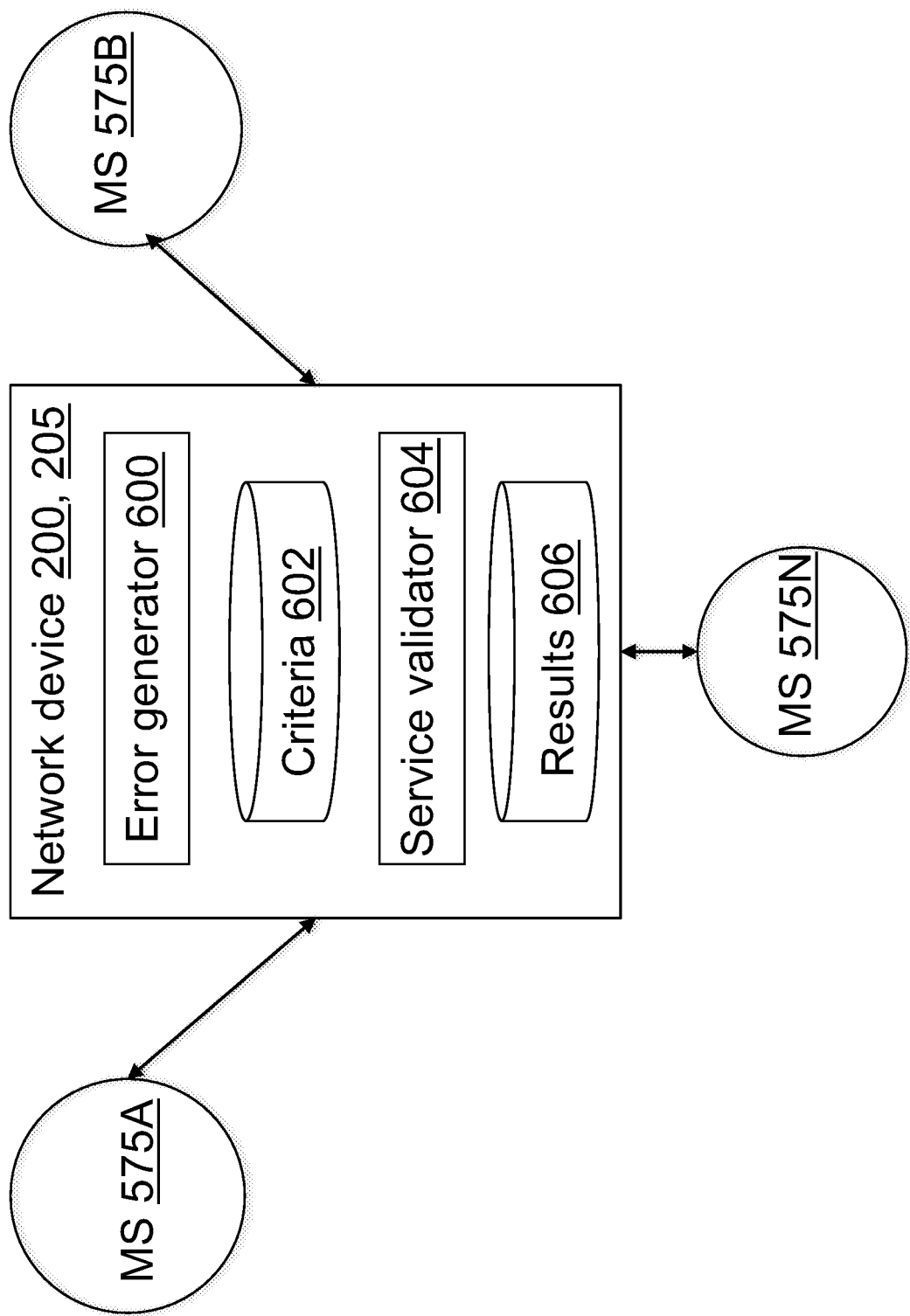
FIG. 6A is a block diagram of an implementation of a system for synthetic error injection and monitoring.

FIG. 6A is a block diagram of an implementation of a system for synthetic error injection and monitoring. A network device 200, 205, sometimes referred to as a proxy, intermediary device, monitoring device or server, or by other such terms, may be deployed intermediary to a plurality of microservices 575A-575N. The network device 200, 205 may comprise an error generator 600, a database of criteria or parameters, a service validator 604, and/or a database or log of measurements or validation results 606.

In some implementations, an error generator 600 may comprise an application, service, server, daemon, routine, or other executable logic for injecting synthetic errors and/or adding latency to communications traversing the network device. In some implementations, error generator 600 may comprise hardware, such as a hardware switch, buffer, or other device for delaying, reordering, or filtering communications traversing the device. In some implementations, error generator 600 may comprise hardware such as an FPGA or ASIC implementing packet filtering, buffering, injection, and/or modifications of packet headers and/or payloads. As discussed above, synthetic errors may comprise any sort of injected or intentionally created error, including packet dropouts, corruption, fragmentation, reordering, error codes, or other such errors.

In some implementations, error generator 600 may be configured to inject synthetic errors or latency to a communication flow based on one or more criteria stored in a database 602 or other data structure (e.g. flat file, XML data file, etc.). The criteria may comprise time periods, durations, or frequency for error injection or combinations of these (e.g. once per week, from 2-3 AM, for 1 minute at a time, every ten minutes). The criteria may comprise a status or condition of a microservice, such as when usage or CPU or memory load of a microservice is less than a threshold, when the microservice has fewer than a threshold number of concurrent users or connections, when the microservice has had uptime greater than a predetermined duration, etc. The criteria may comprise a type of packet or contents of a packet traversing the device, such as when a service has received a request to initiate a connection from a device in a particular region or IP range, or when the service has responded with an error message to a request, or any other type and form of packet. Multiple criteria may be applied to trigger synthetic error injection, such as a particular time of day and usage less than a threshold. Additionally, multiple criteria may be used separately as triggers for synthetic error injection to a particular microservice, such as if the service has had more than a threshold number of connections or if a time is between 2 and 3 AM. Combinations of the criteria may be configured via Boolean logic in some implementations (e.g. ([criteria 1]AND[criteria 2])OR[criteria 3], etc.) or may be applied individually, with an intermediary device iterating through potential criteria.

In some implementations, a service validator 604 may comprise an application, service, server, daemon, routine, or other executable logic for measuring a response or responses to a synthetic error and validating or invalidating a service or microservice. For example, service validator 604 may monitor the time it takes for a communications flow to recover and resume after intentionally dropping packets or inserting out of order packets or spurious requests in the flow. Service validator 604 may perform any type of measurement, including measuring packet sizes, sequence numbers, jitter, latency, processing delay, etc. Measurements need not be confined to packet or connection characteristics, and may also include status of microservices obtained via API or remote procedure calls to the microservices, such as processor or memory load, uptime, number of concurrent connections or users, or any other type and form of information. The service validator 604 may determine whether a microservice properly handles or does not handle a synthetic error, e.g. based on whether the microservice is able to resume normal operations within a predetermined time after the synthetic error, whether the microservice properly reports or logs an error (which may be retrieved via an API or remote procedure call), etc. A microservice has not handled an error when it is unable to recover, when it fails to log or report the error, when communications remain impaired or delayed, when users experience dropouts, delays, or errors, etc.

Measurements and/or validation results may be stored in a database 606 or other data structure maintained by service validator 604. In some implementations, validation results and/or measurements may be displayed via a user interface, e.g. to an administrator of the system or a user or users of the microservices. For example, in some implementations, a user interface may be provided to users of the system with icons or other identifiers of one or more microservices, and with overlay icons or other indicators (e.g. colored dots, plus signs or minus signs, scores, or other such indicators) indicating whether a microservice has or has not been validated and/or is able to recover or has recovered from errors.

Although shown separately, one or more of components 600-606 may be provided together, e.g. as part of a monitoring application or service. Similarly, although shown on a single device 200, 205, in many implementations, components 600-606 may be divided amongst a plurality of devices 200, 205 (e.g. an error generator 600 on a first device intermediary to microservices 575, and a service validator 604 on a second device not intermediary to microservices 575 but in communication with them to retrieve status information).

As shown, network device 200, 205 may be deployed intermediary to a plurality of microservices 575 (as well as potentially between one or more microservices 575 and one or more client devices or other servers, not illustrated). Accordingly, in many such implementations, error generator 600 may be able to insert synthetic errors into communications or add latency to communications traversing the network device 200, 205 between microservices 575 (e.g. East/West communications) as well as between microservices and clients or other servers (e.g. North/South communications).

Figure 6B:
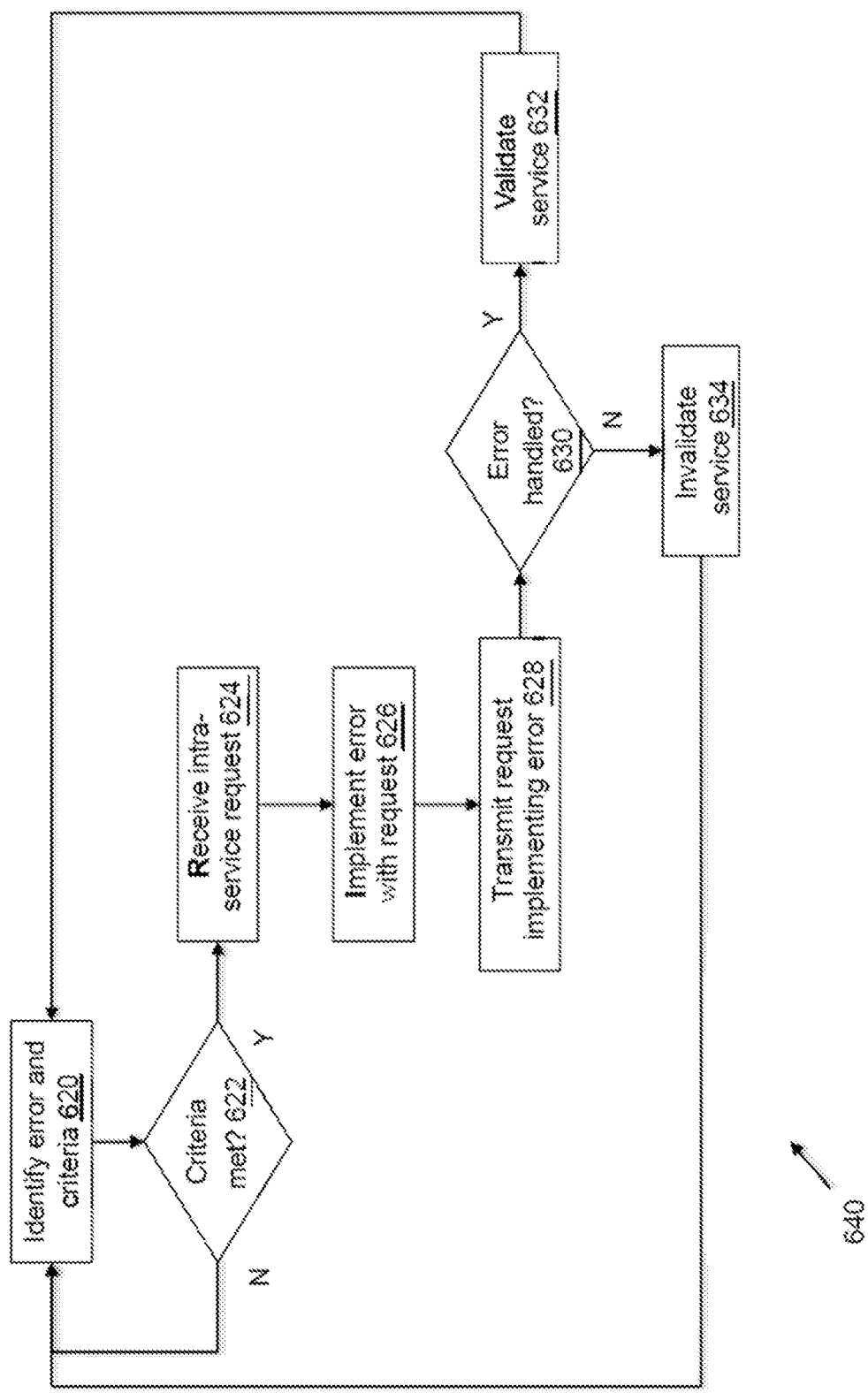
FIG. 6B is a flow diagram of a method for synthetic error injection and monitoring, according to some implementations.

FIG. 6B is a flow diagram of a method 640 for synthetic error injection and monitoring, according to some implementations. At step 620, a monitoring device or intermediary device may identify one or more synthetic errors to apply to one or more microservices, and corresponding criteria or parameters for applying the errors. The criteria may comprise a status or condition of a corresponding microservice, a type of request, a time period, a duration, a frequency, or any other type and form of criteria, including average packet loss, block error rates, numbers of concurrent users or connections, type of service, etc.

At step 622, the device may determine whether the criteria has been met. In some implementations, the device may monitor packets or communications traversing the device to and/or from a microservice, may monitor a clock or timer or network time source or other such time indicator, and/or may monitor status of one or more microservices. In some implementations, the device may periodically request a status from a microservice (e.g. via an API or remote procedure call) and may receive a status report indicating the status (e.g. CPU utilization, memory utilization, bandwidth utilization, error rates, number of concurrent connections, data transmitted or received, etc.). If the criteria has not been met, then steps 622 and/or 620-622 may be repeated periodically.

If the criteria has been met, the intermediary device may implement or apply the synthetic error. At step 624, the device may receive an intra-service request (or, in some implementations, an inter-service request, such as a request from an external server). The request may comprise any type and form of a request, such as a data request, a synchronization request, an RPC or API call, or any other such request. In some implementations, the request may be a response to a prior request, and may be referred to as a 'request' because some further data exchange is implied (e.g. an acknowledgement or other data transfer). At step 626, the device may apply the synthetic error using the received request. Applying the synthetic error may comprise buffering or holding the request for a period of time prior to transmitting or forwarding the request to the destination microservice, thereby adding latency, in some implementations. In other implementations, applying the synthetic error may comprise editing a header and/or payload of the request, such as by adding random data to the header or payload, truncating the header and/or payload, modifying data in the header or payload (e.g. incrementing or decrementing sequence numbers or editing options flags, etc.), fragmenting the request into multiple packets, or performing other error-causing modifications. As discussed above, in some implementations, criteria may comprise parameters for applying the synthetic error, such as a latency time to apply to a packet or request, a rate of change of latency, etc. The synthetic error may be applied in accordance with the criteria. At step 628, the modified or buffered request may be forwarded to the recipient microservice.

In some implementations, applying the synthetic error may comprise dropping the request, and, in a further implementation, transmitting an error code or other status identifier (e.g. HTTP 503 code). In many implementations, multiple synthetic errors may be applied together (e.g. buffering the request for a predetermined time period, then dropping the request and sending an error code).

At step 630, the device may determine whether the microservice has properly handled the synthetic error. Handling the error may comprise retransmitting the initial request; reporting an error to a monitoring server, administrator, or the device; transmitting additional data such as a request with a modified window size (e.g. to reduce bandwidth requirements or avoid congestion implied by the synthetic error, etc.); reconnecting a lost or dropped connection; throttling bandwidth on other connections; etc. If the microservice properly handled the synthetic error, then at step 632, the device may validate the microservice. Validating the microservice may comprise storing an indicator in a log, updating a user interface on the device or a client device, or performing other such features.

Conversely, if the microservice did not properly handle the synthetic error, then at step 634, the device may invalidate the microservice. Invalidating the microservice may comprise storing an indicator in a log, updating a user interface on the device or a client device, sending a notification or message to another device of an administrator, or performing other such features.

Accordingly, the systems and methods discussed herein enable an administrator to proactively monitor and identify issues with resources. The system may be configured with the ability to introduce synthetic errors and latency. Any service in communication with system may reap the benefits of error detection and mitigation, such as validating how a service behaves when a dependent service begins misbehaving. By providing a consistent and standard configuration for injecting errors and latency, all services can be tested with this method.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for validating a microservice, the method comprising:
 (a) identifying, by a device intermediary to a plurality of microservices, a synthetic error and a first criteria relating to a status or condition of a first microservice of the plurality of microservices, the first criteria comprising a standard operating status or condition;

(b) comparing, by the device, the status or condition of the first microservice to a threshold associated with the standard operating status or condition;

(c) responsive to a determination that the monitored status or condition is within the threshold associated with the standard operating status or condition, implementing the synthetic error by:

(d) receiving, by the device, a request from the first microservice to access a second microservice of the plurality of microservices, the request provided to the second microservice by the device, (e) receiving, by the device, a response to the request from the second microservice, and (f) communicating, by the device responsive to the determination, to the first microservice, the response from the second microservice while implementing the synthetic error; and (g) validating, by the device, that the first microservice one of handled or did not handle the synthetic error.

2. The method of claim 1, wherein the first criteria comprises one of a time period, a duration, or a frequency.

3. The method of claim 1, wherein the first criteria comprises identification of a type of request.

4. The method of claim 3, wherein (d) further comprises determining, by the device, that the request corresponds to the type of request of the first criteria.

5. The method of claim 1, wherein (a) further comprises identifying, by the device, a latency time and a second criteria for implementing the latency.

6. The method of claim 5, further comprising determining, by the device, that the second criteria has been met.

7. The method of claim 6, further comprising:

receiving, by the device, a second request from the first microservice to access one of the plurality of microservices;

delaying, by the device, a second response to the second request in accordance with the latency time; and validating, by the device, that the first microservice one of handled or did not handle the latency.

8. The method of claim 1, further comprising:

identifying, by the device, one of a plurality of synthetic errors or a plurality of latency times to implement responsive to a plurality of criteria to validate one or more of the plurality of microservices; and responding, by the device, to requests by implementing the one of the plurality of synthetic errors or one of the plurality of latency times.

9. The method of claim 1, wherein the threshold is based on at least one of: a usage of the first microservice, a central processing unit of the first microservice, a memory load of the first microservice, a number of concurrent users, a number of concurrent connections, or an uptime duration.

10. The method of claim 1, wherein validating, by the device, that the first microservice one of handled or did not handle the synthetic error comprises at least one of determining that the first microservice returned to the standard operating status or condition within a predetermined time or reported an error in an error log.

11. A system for implementing a synthetic error to validate a microservice, the system comprising:

a device comprising one or more processors, coupled to memory and intermediary to a plurality of microservices, the device configured to:

identify the synthetic error and a first criteria relating to a status or condition of a first microservice of the plurality of microservices for implementing the synthetic error to validate the first microservice of the plurality of microservices, the first criteria comprising a standard operating status or condition;

compare the status or condition of the first microservice to a threshold associated with the standard operating status or condition;

responsive to a determination that the monitored status or condition is within the threshold associated with the standard operating status or condition, implementing the synthetic error by:

receiving a request from the first microservice to access a second microservice of the plurality of microservices, the request provided to the second microservice by the device, receiving a response to the request from the second microservice, and communicating, responsive to the determination, to the first microservice, the response from the second microservice while implementing the synthetic error; and validate that the first microservice one of handled or did not handle the synthetic error.

12. The system of claim 11, wherein the first criteria comprises one of a time period, a duration or a frequency.

13. The system of claim 11, wherein the first criteria comprises identification of a type of request.

14. The system of claim 13, wherein the device is further configured to determine the request corresponds to the type of request of the first criteria.

15. The system of claim 11, wherein the device is further configured to identify a latency time and a second criteria for implementing the latency.

16. The system of claim 15, wherein the device is further configured to determine that the second criteria has been met.

17. The system of claim 16, wherein the device is further configured to receive a second request from the first microservice to access one of the plurality of microservices; delay a second response to the second request in accordance with the latency time; and validate that the first microservice one of handled or did not handle the latency.

18. The system of claim 11, wherein the device is further configured to identify, in order to validate one or more of the plurality of microservices, one of a plurality of synthetic errors or a plurality of latency times to implement responsive to a plurality of criteria; and respond to requests to implement the one of the plurality of synthetic errors or one of the plurality of latency times.

19. The system of claim 11, wherein the threshold is based on at least one of: a usage of the first microservice, a central processing unit of the first microservice, a memory load of the first microservice, a number of concurrent users, a number of concurrent connections, or an uptime duration.

20. The system of claim 11, wherein validating that the first microservice one of handled or did not handle the synthetic error comprises at least one of determining that the first microservice returned to the standard operating status or condition within a predetermined time or reported an error in an error log.

* * * * *